Aug. 12, 1952     J. F. DOVE     2,606,988
ARC WELDING ELECTRODE HOLDER
Filed June 29, 1949     2 SHEETS—SHEET 1
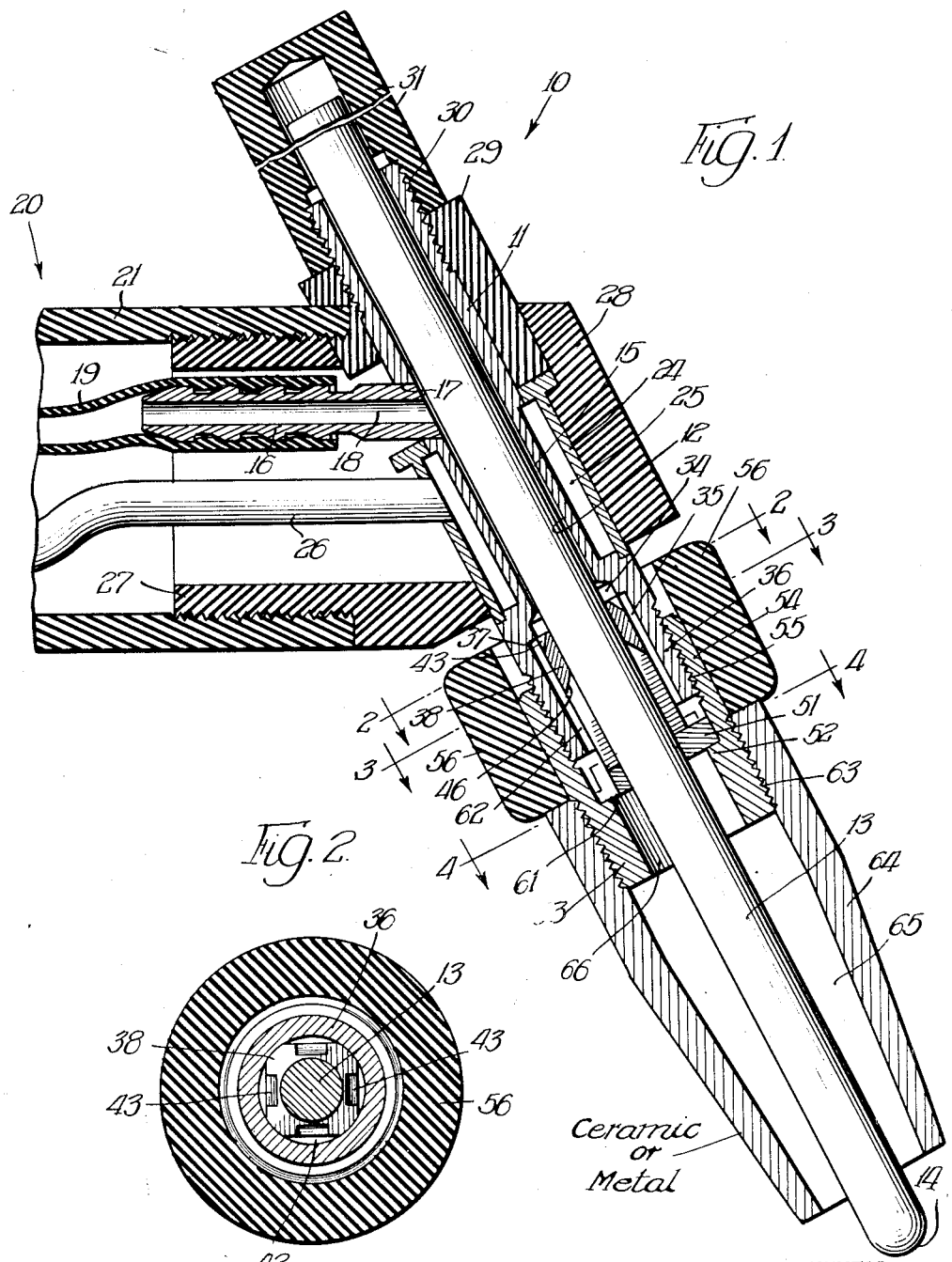
INVENTOR.
John F. Dove,
BY
Robert R. Lockwood
Atty.

Aug. 12, 1952     J. F. DOVE     2,606,988
ARC WELDING ELECTRODE HOLDER
Filed June 29, 1949     2 SHEETS—SHEET 2
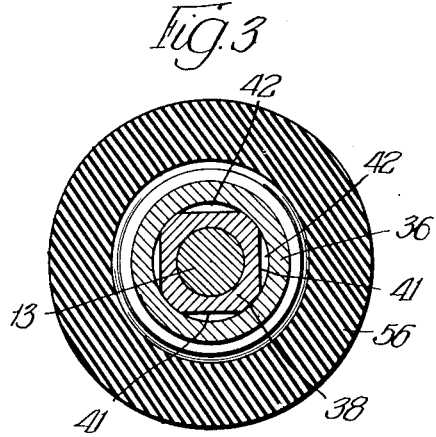
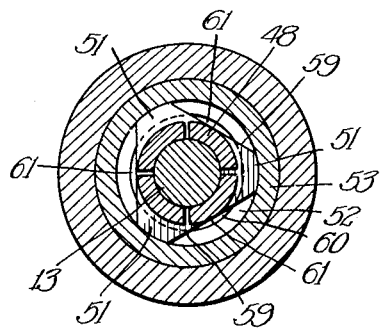
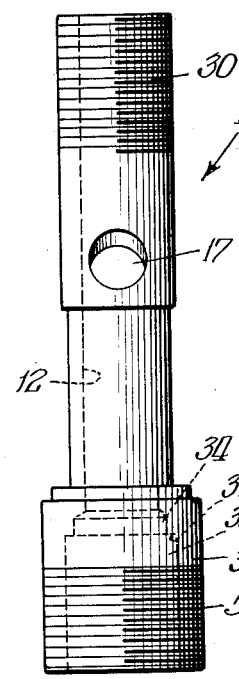
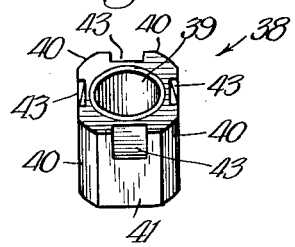
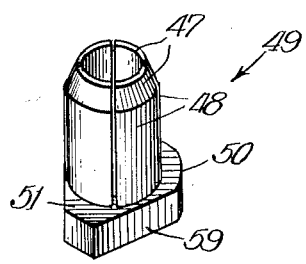
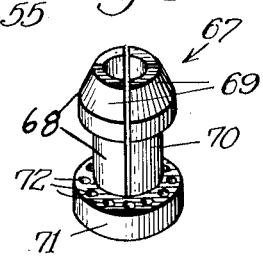
INVENTOR.
John F. Dove,
BY Robert R. Lockwood Patented Aug. 12, 1952

2,606,988

UNITED STATES PATENT OFFICE 2,606,988

ARC WELDING ELECTRODE HOLDER

John F. Dove, Lombard, Ill., assignor to National Cylinder Gas Company, Chicago, Ill., a corporation of Delaware Application June 29, 1949, Serial No. 102,118

9 Claims. (Cl. 219—15)

This invention relates, generally, to arc welding electrode holders, and it has particular relation to such holders in which an inert gas is supplied therethrough to envelop the arc.

Among the objects of this invention are: To provide for gripping a non-consumable welding electrode and at the same time providing one or more gas passageways around the gripping means to direct the flow of gas to the arc; to employ a collet seat and a collet in a suitably shaped tubular metallic body portion for this purpose; to provide the gas passageways between the body portion, the collet seat and the collet; and to provide for moving the collet with respect to its seat so as to grip the electrode and conduct welding current thereto.

Other objects of this invention will, in part, be obvious and in part appear hereinafter.

This invention is disclosed in the embodiment thereof shown in the accompanying drawings, and it comprises the features of construction, combination of elements and arrangement of parts which will be exemplified in the construction hereinafter set forth and the scope of the application of which will be indicated in the appended claims.

For a more complete understanding of the nature and scope of this invention, reference can be had to the following detailed description, taken together with the accompanying drawings, in which:

Figure 1 is a sectional view through an arc welding electrode holder in which the present invention is incorporated;

Figures 2, 3, and 4 are sectional views taken, respectively, along the lines 2—2, 3—3, and 4—4 of Figure 1;

Figure 5 is a view, in side elevation, of a metallic body portion which is employed in the electrode holder shown in Figure 1;

Figure 6 is a perspective view of a collet seat which interfits with the metallic body portion shown in Figure 5;

Figure 7 is a perspective view of a collet which cooperates with the collet seat shown in Figure 6; and Figure 8 is a perspective view of another embodiment of the collet.

Referring now particularly to Figure 1 of the drawings, it will be observed that the reference character 10 designates, generally, the forward portion of an arc welding torch of the type disclosed in Girard and Roach application Serial No. 67,794, filed December 29, 1948, now U. S. Patent 2,532,807 granted December 5, 1950. It will be understood, however, that the present invention can be employed with other types of arc welding torches.

The torch 10 includes a tubular metallic body portion, shown generally at 11 in Figure 5, and it may be formed of suitable conducting material such as brass. The body portion 11 has a central longitudinally extending small diameter bore 12 for receiving an electrode 13 of the non-consumable type. It will be understood that a welding arc is maintained between the lower end 14 of the electrode 13 and the work on which the welding operation is to be performed. As shown in Figure 1 the electrode 13 is spaced slightly from the bore 12 so as to provide an annular gas passageway 15. A suitable inert gas can be supplied to the gas passageway 15 by a nipple 16 which extends through an opening 17, Figure 5, in the body portion 11. As shown in Figure 1 the nipple 16 has a longitudinally extending opening 18 and a flexible hose 19 cooperates therewith to provide the necessary connection to a suitable supply of inert gas.

It will be observed that the flexible hose 19 extends through a handle, shown generally at 20, by means of which the torch 10 is manipulated. The handle 20 includes a sleeve 21 of suitable insulating material only a portion of which is shown.

Surrounding the central portion of the metallic body portion 11 is a metallic sleeve 24. It is secured thereto in any suitable manner so as to provide a liquid tight annular passageway 25 through which a coolant, such as water, can be circulated for extracting heat from the torch 10. A metallic tube 26 extends through the sleeve 24, shown in Figure 1, for the purpose of removing the coolant from the passageway 25. Another tube (not shown) serves to supply the coolant to the passageway 25. The metallic tube 26 also serves to conduct current to the metallic body portion 11 through the sleeve 24 for maintaining the arc between the electrode 13 and the work on which the welding operation is to be performed.

An insulating sleeve 27 surrounds the nipple 16 and the metallic tube 26. The sleeve 27 has the sleeve 21 threaded onto it as shown. Additional insulation is provided by an insulating sleeve 28 which is formed integrally with the sleeve 27 and surrounds the metallic sleeve 24. The insulating sleeve 28 is telescoped over a smaller diameter insulating sleeve 29 that surrounds the upper end of the metallic body portion 11.

The upper end of the metallic body portion 11 is threaded as indicated at 30 for receiving an insulating cap 31 which telescopes over the upper end of the welding electrode 13 and serves to provide a gas tight extension of the metallic body portion 11.

The present invention is concerned particularly with the manner in which the welding electrode 13 is gripped at the lower or arc end of the tubular metallic body portion 11 and also with the manner in which the annular gas passageway 15 is placed in communication with the space outside of the metallic body portion 11.

As illustrated in Figures 1 and 5 of the drawings, the central longitudinal small diameter bore 12 in the metallic body portion 11 opens at the arc end into a coaxial bore 34 of intermediate diameter that, in turn, opens into a coaxial bore 35 of large diameter at the arc end 36. A shoulder 37 is formed at the inner end of the large diameter bore 35 against which a collet seat, shown generally at 38 in Figure 6, rests. The collet seat 38 has a central opening 39 through which the non-consumable electrode 13 extends. Also it has rounded corners 40 which are dimensioned so that a press fit is had between the collet seat 38 and the large diameter bore 35. These rounded corners 40 serve to center the collet seat 38 with the central opening 39 located so that the electrode 13 will be centrally located in the small diameter bore 12. It will be observed that the collet seat 38 is generally rectangular in cross section and that it has flat longitudinally extending sides 41 between the rounded corners 40. As shown in Figure 3 of the drawings, these flat sides 41 and the adjacent surface of the large diameter bore 35 define segmental passageways 42 through which the inert gas can flow from the annular gas passageway 15. The flat sides 41 are grooved as indicated at 43 intermediate their inner ends so as to increase the cross-sectional area of the gas passageways between the bore of intermediate diameter 34 and the segmental passageways 42. This relationship is illustrated more clearly in Figures 1 and 2 of the drawings.

The outer end of the collet seat 38 has an outflared conical seating surface 46, Figure 1, which is arranged to receive the conically shaped ends 47 of fingers 48 that are formed integrally with a collet which is shown, generally, at 49 in Figure 7. The collet 49 has a triangular base portion 50 with apex portions 51 that bear against an annular shoulder 52 which is formed integrally with a retaining sleeve 53. The upper portion 54 of the retaining sleeve 53 is internally threaded and is arranged to be threaded on external threads 55 which are located on the arc end 36 of the body portion 11. An insulating collar 56 is suitably secured to the upper end of the retaining sleeve 53 for the purpose of facilitating the turning of the latter onto and off of the arc end 36 of the body portion 11.

As illustrated in Figures 4 and 7 of the drawings, the triangular base portion 50 of the collet 49 has flat intermediate portions 59 which cooperate with the inner edge 60 of the shoulder 52 to define three segmental gas passageways 61. These gas passageways 61 serve to place the annular space 62 between the outer surfaces of the fingers 48 and the wall of the large diameter bore 35 in communication with the outside of the body portion 11. There is thus provided a passageway for the inert gas from the annular gas passageway 15 to the outside.

It will be observed that the retaining sleeve 53 is externally threaded as indicated at 63 and that a ceramic or metal gas cup 64 is screwed thereon. The gas cup 64 encloses a space 65 about the arcing end 14 of the electrode 13 and serves to direct the flow of the gas over the arc.

It will be understood that the electrode 13 is gripped by the fingers 48 of the collet 49. This is accomplished when the retaining sleeve 53 is screwed onto the external threads 55 at the arc end 36 of the metallic body portion 11. The apex portions 51 of the triangular base 50 rest upon the annular shoulder 52 and, as the retaining sleeve 53 is threaded onto the metallic body portion 11, the conically shaped ends 47 of the fingers 48 slide over the outflared conical seating surface 46 of the collet seat 38 and they are forced inwardly into contact engagement with the electrode 13. This gripping action not only serves to provide the desired electrical contact with the electrode 13 but also it serves to center it in the welding torch 10.

Now it will be understood that the flow of inert gas takes place from the annular gas passageway 15 into the bore 34 of intermediate diameter and thence through the grooves 43 into the four segmental passageways 42. These passageways 42 communicate with the annular space 62 between the fingers 48 and the large diameter bore 35. This annular space 62 is in communication with the space 65 within the gas cup 64 through the three segmental gas passageways 61 and the annular space 66 within the lower end of the retaining sleeve 53 around the electrode 13.

While it is preferable to provide the grooves 43 at the upper end of the collet seat 38, they may be omitted and the gas may pass from the bore of intermediate diameter 34 into the segmental passageways 42.

As indicated, the metallic body portion 11 is formed of good electrical conducting material such as brass. The collet seat 38 and the retaining sleeve 53 preferably are formed of yellow brass. The collet 49 is formed preferably of Phosphor bronze in order to provide the desired resiliency for the fingers 48.

In Figure 8 another form of collet is shown, generally, at 67 and it can be used in lieu of the collet 49. It comprises fingers 68 having conically shaped ends 69 and an intermediate undercut portion 70 to increase flexibility. The fingers 68 are formed integrally with a circular base 71 that is arranged to bear against the annular shoulder 52. Holes 72 through the base 71 serve to place the annular space 62 around the collet 67, when assembled in the torch 10, in communication with the interior of the gas cup 64.

Since certain further changes can be made in the foregoing constructions and different embodiments of the invention can be made without departing from the spirit and scope thereof, it is intended that all matter shown in the accompanying drawings and described hereinbefore shall be interpreted as illustrative and not in a limiting sense.

What is claimed as new is:

1. In an arc welding electrode holder wherein a shielding gas is supplied to envelop the arc, in combination, a metallic body portion having a central longitudinal small diameter bore for receiving a rodlike cylindrical electrode therethrough and spaced therefrom to provide an annular gas passageway therebetween, said small diameter bore at the arc end opening into a coaxial bore of large diameter, a retaining sleeve threaded on the arc end of said body portion and constituting an extension thereof and having a radially inwardly extending annular shoulder, a collet seat having inner and outer ends and a central opening for receiving said electrode and having at least one longitudinally extending flat side, said flat side of said collet seat and the adjacent large diameter bore surface defining a segmental gas passageway, the inner end of said collet seat being grooved intermediate its flat side to place said annular gas passageway in communication with said segmental gas passageway, said collet seat having an outflared conical seating surface at its outer end, and a collet disposed in said large diameter bore having a base portion bearing against said annular shoulder of said retaining sleeve, said base portion having a flat side which together with the inner edge of said shoulder defines a segmental gas passageway placing the interior of said retaining sleeve in communication with the space beyond said base portion, said collet having a plurality of fingers integral with its base portion and surrounding said electrode and spaced from said large diameter bore and the inner surface of said retaining sleeve to provide an annular gas passageway therebetween placing said segmental gas passageways in communication, the inner ends of said fingers being conically shaped to engage said conical seating surface whereby, when said retaining sleeve is screwed onto said body portion, said fingers are moved radially inwardly to grip said electrode as a result of relative movement of said conical ends of said fingers and said conical seating surface.

2. In an arc welding electrode holder wherein a shielding gas is supplied to envelop the arc, in combination, a metallic body portion having a central longitudinal small diameter bore for receiving a rodlike cylindrical electrode therethrough and spaced therefrom to provide an annular gas passageway therebetween, said small diameter bore at the arc end opening into a coaxial bore of large diameter, a retaining sleeve threaded on the arc end of said body portion and constituting an extension thereof and having a radially inwardly extending annular shoulder, a collet seat having inner and outer ends and a central opening for receiving said electrode and having a generally rectangular cross section with rounded corners to center the same at the inner end of said large diameter bore, the flat sides of said collet seat and the adjacent large diameter bore surface defining segmental gas passageways, the inner end of said collet seat being grooved intermediate its flat sides to place said annular gas passageway in communication with said segmental gas passageways, said collet seat having an outflared conical seating surface at its outer end, and a collet disposed in said large diameter bore having a base portion bearing against said annular shoulder of said retaining sleeve, said base portion having a flat side which together with the inner edge of said shoulder defines a segmental gas passageway placing the interior of said retaining sleeve in communication with the space beyond said base portion, said collet having a plurality of fingers integral with its base portion and surrounding said electrode and spaced from said large diameter bore and the inner surface of said retaining sleeve to provide an annular gas passageway therebetween placing said segmental gas passageways in communication, the inner ends of said fingers being conically shaped to engage said conical seating surface whereby, when said retaining sleeve is screwed onto said body portion, said fingers are moved radially inwardly to grip said electrode as a result of relative movement of said conical ends of said fingers and said conical seating surface.

3. In an arc welding electrode holder wherein a shielding gas is supplied to envelop the arc, in combination, a metallic body portion having a central longitudinal small diameter bore for receiving a rodlike cylindrical electrode therethrough and spaced therefrom to provide an annular gas passageway therebetween, said small diameter bore at the arc end opening into a coaxial bore of large diameter, a retaining sleeve threaded on the arc end of said body portion and constituting an extension thereof and having a radially inwardly extending annular shoulder, a collet seat having inner and outer ends and a central opening for receiving said electrode and having at least one longitudinally extending flat side, the flat side of said collet seat and the adjacent large diameter bore surface defining a segmental gas passageway, the inner end of said collet seat being grooved intermediate its flat side to place said annular gas passageway in communication with said segmental gas passageway, said collet seat having an outflared conical seating surface at its outer end, and a collet disposed in said large diameter bore having a triangular base portion with the apex portions thereof bearing against said annular shoulder of said retaining sleeve and the intermediate portions thereof together with the inner edge of said shoulder defining segmental gas passageways placing the interior of said retaining sleeve in communication with the space beyond said base portion, said collet having a plurality of fingers integral with its base portion and surrounding said electrode and spaced from said large diameter bore and the inner surface of said retaining sleeve to provide an annular gas passageway therebetween placing said segmental gas passageways in communication, the inner ends of said fingers being conically shaped to engage said conical seating surface whereby, when said retaining sleeve is screwed onto said body portion, said fingers are moved radially inwardly to grip said electrode as a result of relative movement of said conical ends of said fingers and said conical seating surface.

4. In an arc welding electrode holder wherein a shielding gas is supplied to envelop the arc, in combination, a metallic body portion having a central longitudinal small diameter bore for receiving a rodlike cylindrical electrode therethrough and spaced therefrom to provide an annular gas passageway therebetween, said small diameter bore at the arc end opening into a coaxial bore of large diameter, a retaining sleeve threaded on the arc end of said body portion and constituting an extension thereof and having a radially inwardly extending annular shoulder, a collet seat having inner and outer ends and a central opening for receiving said electrode and having a generally rectangular cross section with rounded corners to center the same at the inner end of said large diameter bore, the flat sides of said collet seat and the adjacent large diameter bore surface defining segmental gas passageways, the inner end of said collet seat being grooved intermediate its flat sides to place said annular gas passageway in communication with said segmental gas passageways, said collet seat having an outflared conical seating surface at its outer end, and a collet disposed in said large diameter bore having a triangular base portion with the apex portions thereof bearing against said annular shoulder of said retaining sleeve and the intermediate portions thereof together with the inner edge of said shoulder defining segmental gas passageways placing the interior of said retaining sleeve in communication with the space beyond said base portion, said collet having a plurality of fingers integral with its base portion and surrounding said electrode and spaced from said large diameter bore and the inner surface of said retaining sleeve to provide an annular gas passageway therebetween placing said segmental gas passageways in communication, the inner ends of said fingers being conically shaped to engage said conical seating surface whereby, when said retaining sleeve is screwed onto said body portion, said fingers are moved radially inwardly to grip said electrode as a result of relative movement of said conical ends of said fingers and said conical seating surface.

5. In an arc welding electrode holder wherein a shielding gas is supplied to envelop the arc, in combination, a metallic body portion having a central longitudinal small diameter bore for receiving a rodlike cylindrical electrode therethrough and spaced therefrom to provide an annular gas passageway therebetween, said small diameter bore at the arc end opening into a coaxial bore of intermediate diameter which opens into a coaxial bore of large diameter, there being external threads on the arc end of said body portion, an internally threaded retaining sleeve threaded on said external threads of said body portion and constituting an extension thereof and having a radially inwardly extending annular shoulder, a collet seat having inner and outer ends and a central opening for receiving said electrode and having a generally rectangular cross section with rounded corners to center the same at the inner end of said large diameter bore, the flat sides of said collet seat and the adjacent large diameter bore surface defining segmental gas passageways, the inner end of said collet seat being grooved intermediate its flat sides to place said intermediate diameter bore in communication with said segmental gas passageways, said collet seat having an outflared conical seating surface at its outer end, and a collet disposed in said large diameter bore having a triangular base portion with the apex portions thereof bearing against said annular shoulder of said retaining sleeve and the intermediate portions thereof together with the inner edge of said shoulder defining segmental gas passageways placing the interior of said retaining sleeve in communication with the space beyond said base portion, said collet having a plurality of fingers integral with its base portion and surrounding said electrode and spaced from said large diameter bore and the inner surface of said retaining sleeve to provide an annular gas passageway therebetween placing said segmental gas passageways in communication, the inner ends of said fingers being conically shaped to engage said conical seating surface whereby, when said retaining sleeve is screwed onto said body portion, said fingers are moved radially inwardly to grip said electrode as a result of relative movement of said conical ends of said fingers and said conical seating surface.

6. In an arc welding electrode holder wherein a shielding gas is supplied to envelop the arc, in combination, a metallic body portion having a central longitudinal small diameter bore for receiving a rodlike cylindrical electrode therethrough and spaced therefrom to provide an annular gas passageway therebetween, said small diameter bore at the arc end opening into a coaxial bore of large diameter, a retaining sleeve threaded on the arc end of said body portion and constituting an extension thereof and having a radially inwardly extending annular shoulder, a collet seat having inner and outer ends and a central opening for receiving said electrode and having at least one longitudinally extending flat side, said flat side of said collet seat and the adjacent large diameter bore surface defining a segmental gas passageway in communication with said annular gas passageway, said collet seat having an outflared conical seating surface at its outer end, and a collet disposed in said large diameter bore having a base portion bearing against said annular shoulder of said retaining sleeve with a passageway therethrough placing the interior of said retaining sleeve in communication with the space beyond said base portion, said collet having a plurality of fingers integral with its base portion and surrounding said electrode and spaced from said large diameter bore and the inner surface of said retaining sleeve to provide an annular gas passageway therebetween placing said segmental gas passageway and said passageway through said base portion in communication, the inner ends of said fingers being conically shaped to engage said conical seating surface whereby, when said retaining sleeve is screwed onto said body portion, said fingers are moved radially inwardly to grip said electrode as a result of relative movement of said conical ends of said fingers and said conical seating surface.

7. In an arc welding electrode holder wherein a shielding gas is supplied to envelop the arc, in combination, a metallic body portion having a central longitudinal small diameter bore for receiving a rodlike cylindrical electrode therethrough and spaced therefrom to provide an annular gas passageway therebetween, said small diameter bore at the arc end opening into a coaxial bore of large diameter, a retaining sleeve threaded on the arc end of said body portion and constituting an extension thereof and having a radially inwardly extending annular shoulder, a collet seat having inner and outer ends and a central opening for receiving said electrode and having at least one longitudinally extending flat side, said flat side of said collet seat and the adjacent large diameter bore surface defining a segmental gas passageway in communication with said annular gas passageway, said collet seat having an outflared conical seating surface at its outer end, and a collet disposed in said large diameter bore having a base portion bearing against said annular shoulder of said retaining sleeve, said base portion having at least one flat side which together with the inner edge of said shoulder defines a segmental gas passageway placing the interior of said retaining sleeve in communication with the space beyond said base portion, said collet having a plurality of fingers integral with its base portion and surrounding said electrode and spaced from said large diameter bore and the inner surface of said retaining sleeve to provide an annular gas passageway therebetween placing said segmental gas passageways in communication, the inner ends of said fingers being conically shaped to engage said conical seating surface whereby, when said retaining sleeve is screwed onto said body portion, said fingers are moved radially inwardly to grip said electrode as a result of relative movement of said conical ends of said fingers and said conical seating surface.

8. In an arc welding electrode holder wherein a shielding gas is supplied to envelop the arc, in combination, a metallic body portion having a central longitudinal small diameter bore for receiving a rodlike cylindrical electrode therethrough and spaced therefrom to provide an annular gas passageway therebetween, said small diameter bore at the arc end opening into a coaxial bore of large diameter, a retaining sleeve threaded on the arc end of said body portion and constituting an extension thereof and having a radially inwardly extending annular shoulder, a collet seat having inner and outer ends and a central opening for receiving said electrode and having at least one longitudinally extending flat side, said flat side of said collet seat and the adjacent large diameter bore surface defining a segmental gas passageway in communication with said annular gas passageway, said collet seat having an outflared conical seating surface at its outer end, and a collet disposed in said large diameter bore having a circular base portion bearing against said annular shoulder of said retaining sleeve, said circular base portion having a plurality of holes therethrough placing the interior of said retaining sleeve in communication with the space beyond said base portion, said collet having a plurality of fingers integral with its base portion and surrounding said electrode and spaced from said large diameter bore and the inner surface of said retaining sleeve to provide an annular gas passageway therebetween placing said segmental gas passageway and said holes in said circular base portion in communication, the inner ends of said fingers being conically shaped to engage said conical seating surface whereby, when said retaining sleeve is screwed onto said body portion, said fingers are moved radially inwardly to grip said electrode as a result of relative movement of said conical ends of said fingers and said conical seating surface.

9. In an arc welding electrode holder wherein a shielding gas is supplied to envelop the arc, in combination, a metallic body portion having a central longitudinal small diameter bore for receiving a rodlike cylindrical electrode therethrough and spaced therefrom to provide an annular gas passageway therebetween, conduit means connected to said body portion intermediate its ends to supply shielding gas to said gas passageway, conductor means connected to said body portion to supply welding current thereto, and metallic clamp means at the arc end of said body portion for gripping said electrode and electrically interconnecting it with said body portion; said metallic clamp means including a collet seat freely slidably and rotatably received within said body portion with an opening therethrough for receiving said electrode and being substantially filled thereby, a collet cooperating with said collet seat and having a plurality of fingers for gripping said electrode, and a threaded member for forcing said collet into said gripping engagement, said collet seat and collet having contiguous outer wall portions spaced from the inner surface of said body portion thereby forming therewith a conduit placing said gas passageway in communication with the atmosphere around the arc end of said electrode.

JOHN F. DOVE.

REFERENCES CITED

The following references are of record in the file of this patent:

UNITED STATES PATENTS

| Number | Name | Date |
| --- | --- | --- |
| 2,468,805 | Herbst | May 3, 1949 |
| 2,468,807 | Herbst | May 3, 1949 |